US005803318A

United States Patent [19]

Lina

[11] Patent Number: 5,803,318

[45] Date of Patent: Sep. 8, 1998

[54] PRECOMPRESSION PUMP

[75] Inventor: Jean-Pierre Lina, Le Neubourg, France

[73] Assignee: Valois S.A., Le Neubourg, France

[21] Appl. No.: 732,330

[22] PCT Filed: Apr. 14, 1995

[86] PCT No.: PCT/FR95/00496

§ 371 Date: Oct. 28, 1996

§ 102(e) Date: Oct. 28, 1996

[87] PCT Pub. No.: WO95/29016

PCT Pub. Date: Nov. 2, 1995

[30] Foreign Application Priority Data

Apr. 27, 1994 [FR] France .................................. 94 05112

[51] Int. Cl.[6] ...................................................... G01F 11/00

[52] U.S. Cl. ..................................... 222/321.2; 222/321.9

[58] Field of Search ............................ 222/321.9, 321.2, 222/321.4, 385

[56] References Cited

U.S. PATENT DOCUMENTS

| | | | |
|---|---|---|---|
| 5,190,192 | 3/1993 | Lina et al. | 222/321.2 |
| 5,482,188 | 1/1996 | Lina | 222/321.2 |
| 5,562,234 | 10/1996 | Su | 222/321.2 |

FOREIGN PATENT DOCUMENTS

| | | | |
|---|---|---|---|
| 0 301 615 | 2/1989 | European Pat. Off. | B05B 11/00 |
| 0 449 046 A3 | 10/1991 | European Pat. Off. | B05B 11/00 |
| WO 93/13873 | 7/1993 | WIPO | B05B 11/00 |

*Primary Examiner*—Philippe Derakshanj
*Attorney, Agent, or Firm*—Sughrue, Mion, Zinn, Macpeak & Seas, PLLC

[57] ABSTRACT

A precompression pump has a hollow cylindrical pump body 1 extending axially between a first end 1*a* and a second end 1*c*, an annular piston 3 sliding axially in the pump body, the piston and the pump body defining a pump chamber 6, and a push rod 40 for controlling the piston and sliding axially inside it. The push rod includes an outlet channel 41*a*, 42*a* which opens out inside the pump body via a lateral opening 42*b*, and the piston is displaceable relative to the push rod to close the lateral opening or to put it into communication with the pump chamber. A resilient precompression spring 47 urges the piston towards the pump chamber and towards a rest position in which it closes the lateral opening of the outlet channel, and a central section of the piston is isolated from the pump chamber, at least while the piston is in the rest position.

5 Claims, 3 Drawing Sheets

PRECOMPRESSION PUMP

BACKGROUND OF THE INVENTION

The present invention relates to an improved precompression pump, and more particularly to a miniaturized pump generally actuated by means of a finger and intended for spraying fluids, generally liquids or semi-liquids such as perfumes, pharmaceuticals, or cosmetics.

An example of a manual precompression pump is described in FR 2,403,465. That type of pump comprises a hollow cylindrical pump body in which there slides an annular piston, said piston being controlled by a push rod which slides in the pump body via a lateral opening. The pump body and the piston together define a pump chamber, and the piston is displaceable relative to the push rod so as to close the lateral opening of the outlet channel or, on the contrary, so as to put it into communication with the pump chamber. The piston is connected to the push rod by a precompression spring which urges the piston towards a position in which said piston closes the lateral opening of the outlet channel.

When pressure is applied to the rod, it urges the piston towards the pump chamber via the precompression spring, thereby establishing suction in the pump chamber. As thrust on the push rod is increased, the pressure in the pump chamber increases and the precompression spring is compressed. When a predetermined pressure obtains in the pump chamber, the precompression spring is sufficiently compressed for the piston to release the lateral opening of the outlet channel and the substance contained in the pump chamber begins to be expelled.

If the user presses hard enough on the push rod, that type of pump functions well and produces a good spray. The predetermined pressure that obtains in the pump chamber during expulsion of the fluid normally gives said fluid a high flow speed giving rise to good spraying, generally via a spray nozzle in a pushbutton mounted on the push rod.

However, if the user presses lightly on the push rod, but just enough to create said predetermined pressure in the pump chamber, then the lateral opening of the outlet channel is not cleanly disengaged by the piston: as a result the fluid can flow therethrough only at a low rate. Since the outlet channel of the rod, and possibly also the spray nozzle, are dimensioned for a higher flow rate, the fluid flows through the outlet channel, and possibly also through the spray nozzle, at a speed that is too low to create a good spray.

SUMMARY OF THE INVENTION

An object of the present invention is to solve that technical problem.

The present invention thus provides a precompression pump comprising at least:

a hollow cylindrical pump body;

an annular piston sliding axially inside the pump body, the piston and the pump body together defining a pump chamber;

a push rod for controlling the piston, having an outside end projecting out from the pump body, said push rod sliding axially in the center of the piston, said push rod including an outlet channel which opens out to the inside of the pump body via a lateral opening, the piston being displaceable relative to the push rod so as to close the lateral opening or so as to put into communication with the pump chamber; and resilient precompression means urging the piston towards the pump chamber and towards a rest position where it closes the lateral opening of the outlet channel;

the pump being characterized in that it further includes a central sealing member displaceable with the push rod and situated axially between the piston and the pump chamber, and said central sealing member is in sealing contact with the piston when said piston is in its rest position, isolating the pump chamber from a central section of the piston.

In one embodiment, the piston includes an axial inside cylindrical surface open towards the pump chamber, said central sealing member sliding in sealed manner in said inside cylindrical surface while isolating the pump chamber from said central section of the piston, and said inside cylindrical surface extends axially towards the pump chamber over a length such that the central sealing member leaves said cylindrical surface when the piston has moved through a certain distance D2 relative to the push rod, starting from the rest position and going towards the outside end of the push rod.

Advantageously, the push rod includes at least one sealing zone situated axially at a location lying between the lateral opening of the outlet channel and the pump chamber, the piston sliding in sealed manner over said sealing zone, thereby isolating the outlet channel from the pump chamber, the piston leaving said sealing zone when it is displaced relative to the push rod axially through a distance D1 greater than D2, starting from its rest position and going towards the outside end of the push rod, and the outlet channel communicates with the pump chamber as soon as the piston has been displaced through said distance D1.

The pump may include a return spring for the push rod, and the pump chamber may include an inlet non-return valve enabling said pump chamber to be filled after each actuation of the pump.

Advantageously, said central sealing member is secured to the push rod.

BRIEF DESCRIPTION OF THE DRAWINGS

Other characteristics and advantages of the invention appear on reading the following description of various particular embodiments of the invention given as non-limiting examples, and described with reference to the accompanying drawings.

In the drawings.

DETAILED DESCRIPTION OF THE PREFERRED EMBODIMENTS

In the various figures, the same references are used to designate portions that are identical or similar.

The pumps described herein are generally made of molded plastics material, the sealing gaskets are generally made of elastomer, and the springs of metal.

Figure 1:
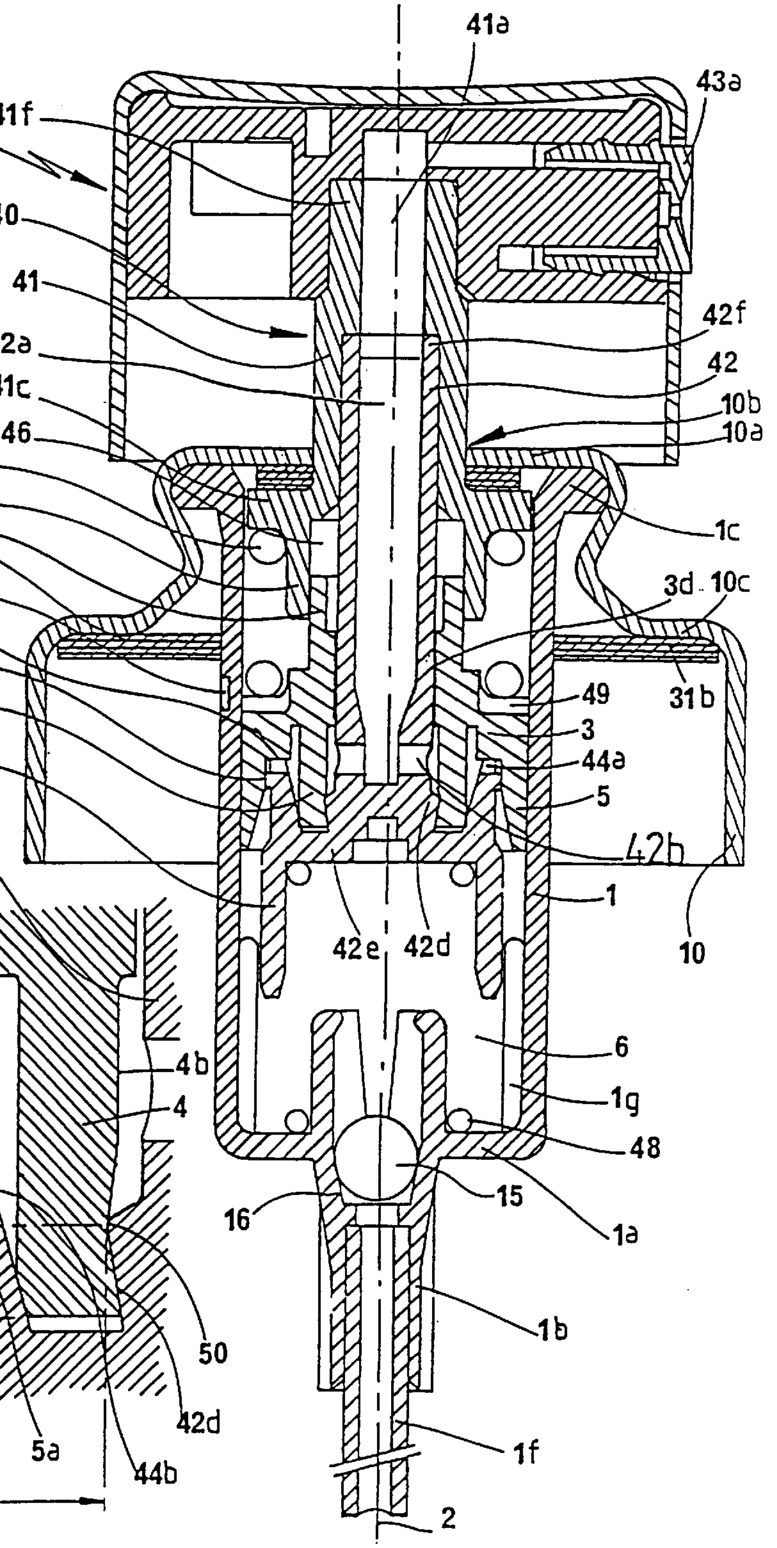
FIG. 1 is a longitudinal section view of a pump constituting a first embodiment of the invention, shown at rest.
Figure 2:
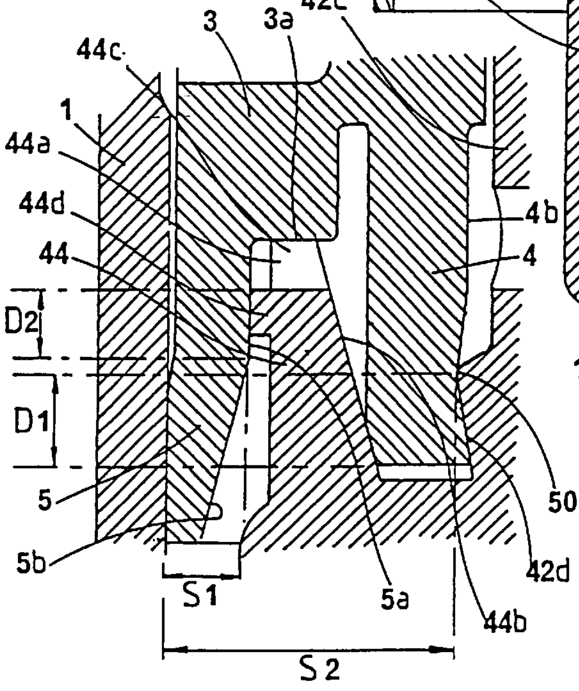
FIG. 2 is a detailed view of the FIG. 1 pump, in its rest position.

FIGS. 1 and 2 show a first embodiment of the pump of the invention. The pump of FIGS. 1 and 2 is an improvement over the pump shown in FIG. 7*b* of European patent EP-0 486 378.

The pump comprises a hollow cylindrical pump body 1 having an axis of symmetry 2. The pump body 1 extends between an open top end 1*c* and a bottom end wall 1*a*. The end wall 1*a* is extended by an inlet duct 1*b* suitable for communicating with a tank containing substance to be dispensed (not shown), either directly or via a dip tube 1*f*.

The pump body 1 defines a pump chamber 6 which normally contains the substance to be dispensed, and which communicates with the inlet duct 1*b* via an inlet non-return valve. The inlet valve may, for example, comprise a conical seat 16 and a ball 15 suitable for bearing in sealed manner against the conical seat 16 to close the inlet duct 1*b* whenever a higher pressure obtains in the pump chamber 6. When suction obtains in the pump chamber 6, then on the contrary, the ball 15 lifts off its seat 16, thereby opening the inlet duct 1B. The inlet valve may have any other known structure, without thereby going beyond the ambit of the present invention.

The pump body 1 may be mounted on the neck of a tank of substance by means of a metal cup 10 which is crimped on the open top end 1*c* of the pump body, said metal cup having an end wall 10*a* provided with a central orifice 10*b*. In the example of FIG. 1, the metal cup 10 also has an enlargement 10*c* and a flat annular gasket 31*b* is located between the enlargement 10*c* and the neck of the tank.

A hollow piston 3 that is circularly symmetrical about the axis 2 slides inside the pump body 1. The piston 3 has an outer skirt 5 with at least one periphery thereof in sealing contact with the pump body 1. In addition, the piston includes an axial inside duct 3*d*. The piston further includes an annular bottom lip 4 which extends axially towards the end wall 1*a* of the pump body and which is located in the center of the piston 3 around the inner duct 3*d*.

The pump also includes an axial push rod 40 centered on the axis 2 and passing through the orifice 10*b* in the metal cup. The push rod 40 is made up of two parts, comprising an outer sleeve 41 fixed on an inner core 42, as a force-fit or by any other means. The outer sleeve 41 is circularly symmetrical about the axis 2. It passes through the central orifice 10*b* of the metal cup 10 and it extends to the outside of the pump body 1 as far as a top or outer end 41*f* which is suitable for receiving a pushbutton 43. The pushbutton 43 serves simultaneously to actuate the pump and to provide an outlet for the substance. As shown in FIG. 1, the pushbutton may include a lateral outlet, possibly fitted with a spray nozzle 43*a*. Nevertheless, the pushbutton 43 could have any other known shape without thereby going beyond the ambit of the present invention. The sleeve 41 has an axial duct 41*a* passing therealong. Starting from the outer end 41*f*, the sleeve 41 extends to the inside of the pump body where it has a collar 41*c* projecting substantially radially outwards. In addition, the sleeve 41 may be fitted with a cylindrical skirt 41*d* that extends towards the bottom end wall 1*a* of the pump body from the collar 41*c*. The outside diameter of the cylindrical skirt 41*d* is smaller than the diameter of the collar 41*c* and its inside diameter is greater than the outside diameter of the inner core 42.

The inner core 42 comprises a first cylindrical portion 42*c* extending from a top end 42*f* towards the bottom end wall 1*a* of the pump body. The top end 42*f* is engaged in the sleeve 41. Said first cylindrical portion 42*c* of the core 42 extends towards the bottom end wall la of the pump body by means of a second portion 42*d* of greater diameter. Said second portion 42*d* is frustoconical in this case, flaring upwards; it could also be cylindrical. From its top end 42*f*, the core 42 is pierced by a blind axial channel 42*a* which communicates with the channel 41*a* of the outer sleeve 41 and which opens out laterally via at least one orifice 42*b* formed in the first cylindrical portion 42*c* in the vicinity of the second portion 42*d*. Said first cylindrical portion 42*c* of the core 42 slides in the inside duct 3*d* of the piston without sealing. The central inside lip 4 of the piston is cylindrical and it includes an inside cylindrical surface 4*b* of inside diameter substantially equal to the outside diameter of the second cylindrical portion 42*d* of the core 42. Thus, the lip 4 can slide in sealed manner over said second portion 42*d*. Also, the piston 3 includes a cylindrical portion 45 which extends axially towards the end 1*c* of the pump body, around the core 42. Said cylindrical portion 45 has an outside diameter that is substantially equal to the inside diameter of the skirt 41*d* of the sleeve 41 so that said cylindrical portion 45 slides with sealing inside the skirt 41*d*. The cylindrical portion 45 and the skirt 41*d* thus define an annular suction chamber 46 disposed around the core 42 and communicating with the orifice 42*b* given that the piston 3 is not in sealing contact with the first cylindrical portion 42*c* of the core 42. The usefulness of this suction chamber is explained below.

Starting from the second cylindrical portion 42*d*, the core 42 is extended radially outwards by an enlargement 42*e* which itself may be extended towards the bottom end wall 1*a* of the pump body by a skirt 42*g*. In the example shown in FIG. 1, the skirt 42*g* co-operates with axial ribs 1*g* formed inside the pump body 1 and extending a certain distance from the bottom end wall 1*a* of said pump body, to guide the core 42 as it moves inside the pump body. The enlargement 42*e* of the core 42 includes a crown 44 which extends axially from said enlargement 42 towards the piston 3 to an end 44*c* close to the piston 3. Advantageously, said crown is interrupted by radial cutouts 44*a* which extend axially over a certain distance from the end 44*c* of the crown 44, as shown in FIG. 2.

The piston 3 has a radial annular surface 3*a* between the skirt 5 and the lip 4. Under the effect of the precompression spring 47, said annular surface 3*a* bears against the crown 44. In addition, the crown 44 has an inside surface 44*b* which is frustoconical, flaring towards the top end 1*c* of the pump body and exerting a radial clamping force on the lip 4 by a wedging effect whenever the crown 44 is in abutment against the surface 3*a* of the piston. In this way, sealing is reinforced at contact between the lip 44 and the second portion 42*d* of the core 42, while the clamping force exerted by the crown 44 is controlled accurately by said crown 44 coming into abutment against the surface 3*a* of the piston, thereby avoiding irreversible deformation or wedging of the lip 4 of the piston. Since the second portion 42*d* of the inner core 42 is frustoconical, it forms an annular rim 50 projecting around the core 42. In this way, when the frustoconical surface 44*b* of the crown 44 exerts its radial clamping force on the lip 4 of the piston, said annular rim 50 exerts pressure on the lip 4 which is concentrated on an internal peripheral line of the lip. As a result, sealing at the contact between said lip 4 and the portion 42*d* is improved.

When the piston is moved from its position in which it is in abutment against the crown 44, the lip 4 slides with sealing over the second portion 42*d* of the core over a distance D1.

Beneath the cutouts 44*a*, the crown 44 also has a collar 44*d* which extends radially outwards.

Also, the skirt 5 of the piston includes a cylindrical inside surface 5*a* which extends axially from the bearing surface 3*a* of the piston towards the bottom end wall 1*a* of the pump body. The cylindrical surface 5*a* extends via a frustoconical surface 5*b* which extends axially towards the bottom end wall 1*a* of the pump body, flaring radially outwards.

When the piston 23 is in abutment against the crown 44, the collar 44*d* of the crown 44 is in sealing contact with the cylindrical inside surface 5*a* of the skirt 5. When the piston is moved from this position, the collar 44*d* slides with sealing in the cylindrical inside surface 5*a* over a distance D2 which is less than D1. Beyond that, the collar 44*d* moves axially inside the frustoconical surface 5*b* of the skirt 5, but without sealing.

Finally, the pump includes a return spring 48 disposed between the enlargement 42*e* of the core and the bottom end wall 1*a* of the pump body. The return spring 48 urges the core 42 and thus the entire push rod assembly 40 towards the open end 1*c* of the pump body. Thus, under drive from the return spring 48, the collar 41*c* of the sleeve 41 is pressed in abutment against the end 10*a* of the metal cup 10. Optionally, an annular sealing ring 31*a* may be interposed between the collar 41*c* and the end 10*a* of the cup 10.

Advantageously, the piston 3 has crenellations or ribs 49 extending substantially radially and against which the precompression spring 47 bears. When the precompression spring 47 is a helical spring, its end turns, when at rest, may occupy planes that are not perpendicular to the axis 2. Under such conditions, the spring 47 would tend to deform the piston, or at least the outside skirt 5 of the piston, skewing it somewhat, i.e. rotating it to some extent about an axis perpendicular to the axis 2. However, since the spring 47 bears against the ribs 49 and not against a continuous surface, the pressure exerted locally by the spring 47 on the ribs 49 is large and as a result the ribs 49 deform so as to enable the spring 47 to dig into said ribs 49 to a greater or lesser extent going towards the piston 3. In this way, even if the end turn of the spring 47 lies in a plane that is not perpendicular to the axis 2, because of the way in which the ribs 49 are deformed, they remain in contact with the spring 47 over substantially all of the periphery of its end turn. In this way, the force applied by the spring 47 is distributed over substantially all of the periphery of the piston 3 such that the piston 3 is not deformed. This guarantees that good sealing is maintained over time at the contact between the skirt 5 of the piston 3 and the body of the pump 1. It will also be observed that the crown 44 which is in abutment against the surface 3*a* of the piston also tends to limit deformation of the piston 3 under the effect of the spring 47, by maintaining the position of said piston.

The pump of FIG. 1 operates as follows. At rest, the piston 3 is in abutment against the crown 44 and the collar 41*c* is in abutment against an annular gasket 31*a* interposed between the collar 41*c* and the end 10*a* of the metal cup. When a user presses on the pushbutton 43, the push rod 40 is caused to move down inside the pump body, thereby urging the piston 3 downwards, because of the precompression spring 47. The volume of the pump chamber 6 thus tends to diminish, thereby establishing pressure that urges the ball 15 against its seat 16, thus isolating the pump chamber 6. Since the substance contained in the pump chamber is generally incompressible, the piston 3 cannot move down inside the pump chamber: therefore only the push rod 40 moves down and the piston 3 may even move up a little inside the pump body.

During this movement, so long as the piston has not moved through the distance D2 relative to the push rod 40 starting from its rest position, only a peripheral section S1 of the piston situated radially outside the collar 44*d* is subjected, initially, to the pressure that obtains inside the pump chamber. The term "section S1" is used herein to mean the projection of the area of the piston exposed to the pressure in the pump chamber onto a plane that is perpendicular to the axis 2 of the pump body. As the user increases thrust on the pushbutton 43, the return spring 48 and the precompression spring 47 are compressed, and the pressure P inside the pump chamber increases progressively. Since the thrust from the user increases relatively slowly, it can be assumed that so long as the piston has not moved through the distance D2 relative to the push rod 40, starting from its rest position, the piston is substantially in mechanical equilibrium. Thus the following equation applies:

$$P \times S1 = F$$

where F is the force exerted by the precompression spring 47 on the piston.

As soon as the piston has moved through the distance D2 relative to the push rod 40, sealing between the collar 44*a* and the skirt 5 of the piston is interrupted, so the pressure P is now applied to an annular section S2 defined on the inside by the annular rim 50 over which the central lip 4 of the piston slides in sealed manner. The section S2 is thus greater than the section S1, while the pressure P does not vary significantly at the instant when sealing is broken between the collar 44*a* and the skirt 5, since the pump chamber remains isolated.

Thus, whereas P×S1=F immediately before sealing is broken, a force much greater than F and equal to P=S2 appears immediately thereafter. Consequently, the piston is subjected to sudden acceleration towards the open end 1*c* of the pump body, and it travels quickly to the end of the distance D1 where the lip 4 of the piston releases the orifice 42*b* and enables substance to escape.

Since the last portion of the movement of the piston relative to the push rod 40 is very fast, the lip 4 rises well beyond the annular rim 50 of the central core 42, such that the orifice 42*b* is wide open, and the substance can immediately be expelled at a high rate.

This has two consequences:

1/ Firstly, since the substance is emitted at a high rate from the beginning, the speed of the substance in the nozzle 43*a* is high. Consequently, spraying is excellent as soon as the substance begins to issue therefrom.

2/ Thereafter, since the initial flow rate of expelled substance is high, the pressure that obtains in the pump chamber drops very suddenly, while still remaining sufficient to prevent the piston 3 being returned to its rest position by the precompression spring 47. Because of this sudden drop in pressure, the user's finger pressing on the pushbutton encounters substantially no further resistance, and it pushes the push rod 40 and the piston 3 quickly to an end-of-stroke position, without the user being able to control this movement.

Thus, unlike prior art precompression pumps, it is not possible to press down the pushbutton slowly, using just enough force to cause the substance to be expelled at a low rate, thereby preventing spraying or causing it to spray poorly. With the pump of the invention, if substance is expelled, then it necessarily takes place at a flow rate which is sufficient to ensure good spraying, and that this continues throughout spraying.

In addition, since spray conditions are excellent, it may be possible to reduce the stiffness of the precompression spring of the pump compared with the stiffness of the precompression spring of a prior art pump without diminishing the quality of spraying. The pump of the invention thus becomes "softer" and easier to user than prior art precompression pumps, insofar as it requires less effort from the user.

When the pressure in the pump chamber is sufficient to counterbalance the force of the precompression spring 47, the piston 3 slides over the rod 40 towards the top end 1*c* of the pump body.

It will also be observed that the lateral orifice 42*b* of the core 42 is pierced in the first cylindrical portion 42*a* of said core where the piston 3 slides without sealing. Thus, even if the edges of the orifice 42*b* present slight molding defects, they do not impede in any way sliding of the piston 3 over the core 42. Also, since there is a certain amount of clearance between the piston 3 and the first cylindrical portion 42*a* of the core 42, the rate at which substance is expelled is improved.

The downwards movement of the piston 3 continues until the skirt 5 of the piston 3 comes into abutment against the ribs 1*g* of the pump body. When the user releases the pushbutton 43, the return spring 48 urges the push rod 40 back towards the end 1*c* of the pump body, and simultaneously the precompression spring 47 urges the piston 3 back towards the crown 44, such that the central bottom lip 4 of the piston again covers the second cylindrical portion 42*b* of the core 42 and the crown 44 again applies a radial clamping effect on said lip 4 of the piston. During this movement of the piston, the volume of the suction chamber 46 increases, and since the piston 3 slides without sealing over the first cylindrical portion 42*c* of the core 42, the suction chamber 46 communicates with the orifice 42*b* such that the increase in volume of the suction chamber 46 generates suction in the axial channel 42*a* of the core 42, in the channel 41*a* of the sleeve 41, and in the outlet passage of the pushbutton 43. This prevents substance contained in the pushbutton 43 dripping or oozing out from said pushbutton while the device is being stored, particularly when the substance is semi-liquid in constancy.

In a variant, the return spring 48 of the pushbutton 40 could be mounted outside the pump body, e.g. between a collar on the sleeve 41 and the end wall 10*a* of the cup 10.

In the embodiment shown, the pump body 1 is pierced by an air intake orifice 18 situated in the vicinity of the soft end 1*c* of the pump body. In addition, when the push rod is pressed down, the collar 41*e* is no longer in contact with the gasket 31*a*, thereby allowing air to pass between the push rod 40 and the gasket 31*a*. Thus, while the piston 3 is rising, with substance being sucked from the tank into the pump chamber 6, a volume of air equal to the volume of substance sucked into the pump chamber can pass into the tank via the air intake orifice 18.

Nevertheless, the pump need not have an air intake orifice 18 and that would not go beyond the ambit of the present invention.

The suction chamber 46 could be omitted without going beyond the ambit of the present invention.

Although not preferred, it would optionally be possible for substance to begin being expelled as soon as sealing between the collar 44*a* and the skirt 5 is broken, i.e. as soon as the piston has moved through the distance D2 relative to the push rod. Under such circumstances, the effect of the impulse given to the piston when said sealing is broken continues to exist, since the section of the piston exposed to the pressure of the pump chamber increases suddenly from S1 to S2. However, the impulse given to the piston 3 is less than in the example of FIG. 1 since the pressure in the pump chamber begins to decrease as soon as the sealing between the collar 44*a* and the skirt 5 is broken, because substance begins to be expelled at that moment.

Figure 3:
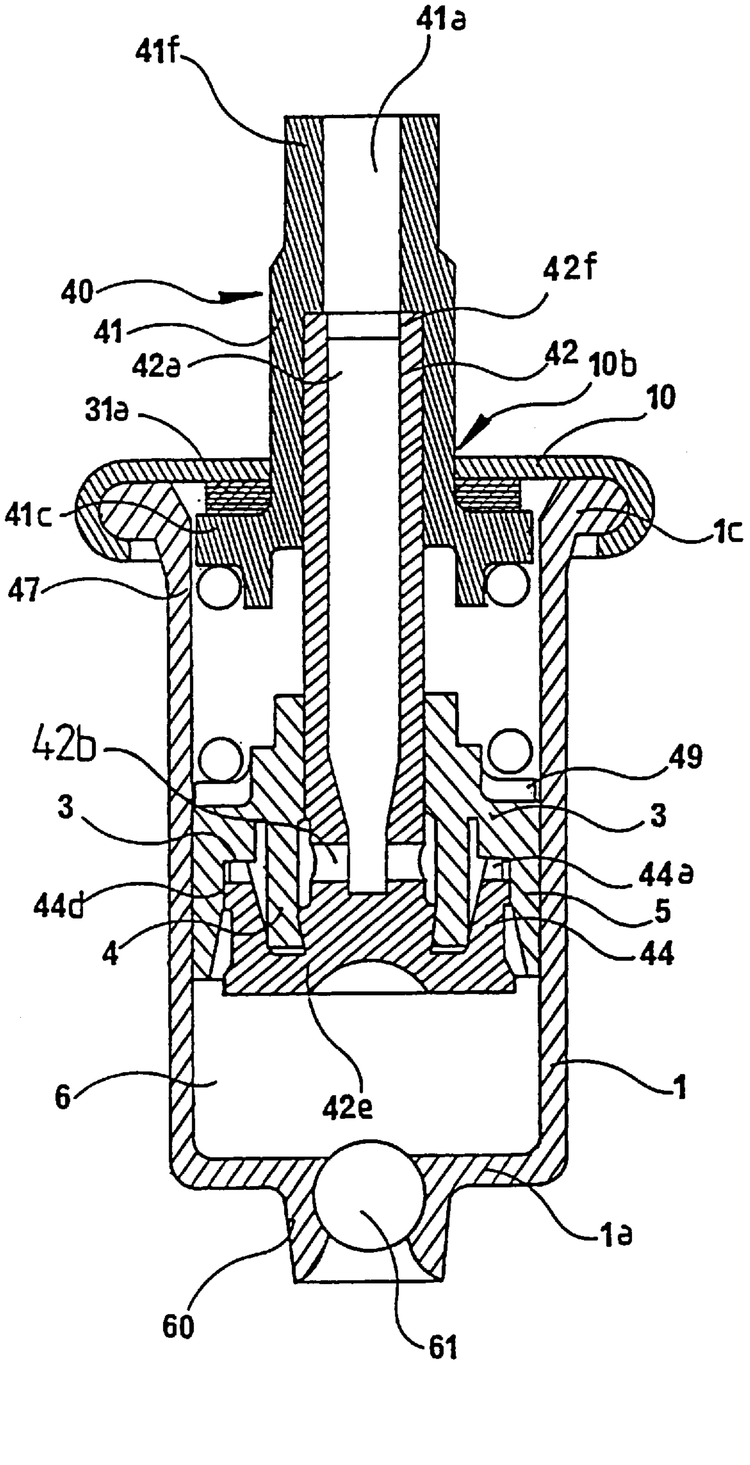
FIG. 3 is a longitudinal section view of a variant of the FIG. 1 pump, for spraying a single dose of substance.

The pump of FIG. 3 is very similar in structure to that of FIG. 1, and it is therefore not described again in detail. This pump differs from that of FIG. 1 in that it is designed to spray or dispense only a single dose of substance, which dose is initially contained in the pump chamber 6. The FIG. 3 pump does not include an air intake orifice 18. Nor does it include the suction chamber 46 of the FIG. 1 pump, so the piston 3 slides with sealing over the core of the rod 40. It should nevertheless be observed that the suction chamber 46 could possibly be retained as in FIG. 1, even though there is little point in having suction in the present case. Finally, the FIG. 3 pump does not have an inlet valve 15, 16 nor does it have an inlet duct 1*b*, it only has a filling passage 60 in the bottom of the pump body and closed by a ball or some other equivalent means.

Figure 4:
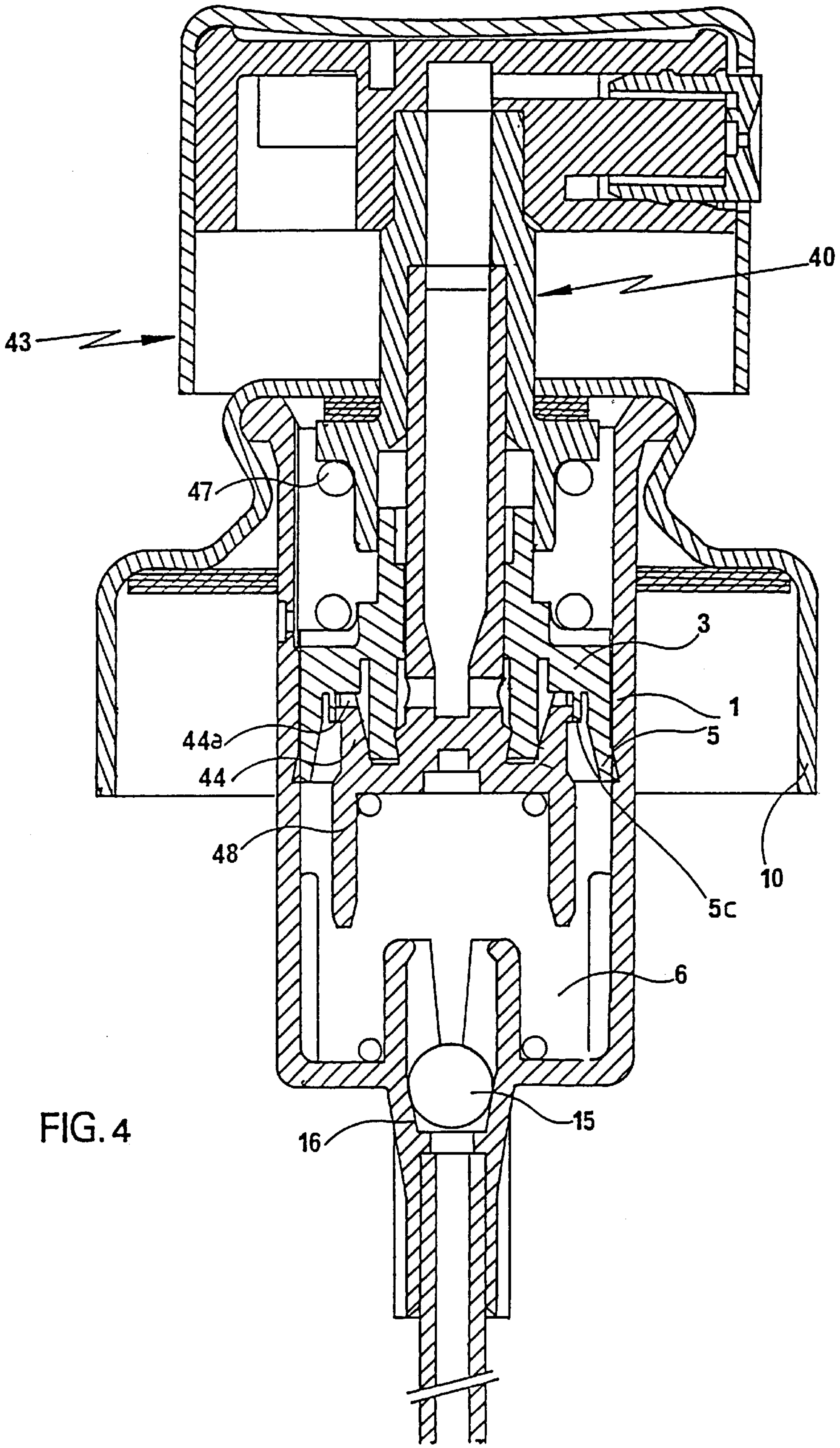
FIG. 4 is a longitudinal section view of a variant of the FIG. 1 pump.

The pump of FIG. 4 is a variant of the pump of FIG. 1, in which the collar 44*a* of the crown 44 slides with sealing not over the inside of the skirt 5 of the piston, but over the inside of an axial cylindrical wall 5*c* that is concentric with the skirt 5.

In the above description, for reasons of clarity, reference has been made to a pump that is in the vertical position with the push rod extending upwards, since that is the commonest position for such devices: naturally, the pump could be used in some other position without thereby going beyond the ambit of the present invention.

I claim:

1. A precompression pump, comprising:

a) a hollow cylindrical pump body (1);

b) an annular piston (3) sliding axially inside the pump body, the piston and the pump body (1) together defining a pump chamber (6);

c) a push rod (40) for controlling the piston, having an outside end projecting out from the pump body, said push rod sliding axially in the center of the piston, said push rod including an outlet channel (41*a*, 42*a*) which opens out to the inside of the pump body via a lateral opening (42*b*), the piston being displaceable relative to the push rod to close the lateral opening or to put it into communication with the pump chamber;

d) resilient precompression means (47) urging the piston towards the pump chamber and towards a rest position at which it closes the lateral opening of the outlet channel;

e) a central sealing member (42*e*, 44) displaceable with the push rod and situated axially between the piston and the pump chamber, said central sealing member being in sealing contact with the piston when said piston is in its rest position, isolating the pump chamber from a central section (S2-S1) of the piston; and f) wherein the central sealing member comprises a radially outwardly directed circular lip member (44*d*) slidably disposed against a cylindrical inside surface (5*a*) of an outermost skirt (5) of the piston, such that a sufficient fluid flow rate for correct spraying is provided even when a user only presses lightly on a push rod.

2. A pump according to claim 1, wherein said cylindrical inside surface extends axially towards the pump chamber over a length such that the central sealing member leaves said cylindrical inside surface when the piston has moved through a first predetermined distance (D2) relative to the push rod, starting from the rest position and going towards the outside end of the push rod.

3. A pump according to claim 2, wherein the push rod includes at least one sealing zone (50) situated axially at a location lying between the lateral opening (42*b*) of the outlet channel and the pump chamber, the piston sliding in sealed manner over said sealing zone, thereby isolating the outlet channel from the pump chamber, the piston leaving said sealing zone when it is displaced relative to the push rod axially through a second predetermined distance (D1) greater than said first predetermined distance, starting from its rest position and going towards the outside from its rest position and going towards the outside end of the push rod, and the outlet channel communicates with the pump chamber as soon as the piston has been displaced through said second predetermined distance.

4. A pump according to claim 1, further including resilient return means (48) for the push rod (40), and an inlet non-return valve (15, 16) for the pump chamber enabling said pump chamber to be filled after each actuation of the pump.

5. A pump according to claim 1, wherein said central sealing member (42*e*, 44) is secured to the push rod (40).

* * * * *